United States Patent

[11] 3,560,727

[72] Inventor John E. Schussler Trevose, Pa.
[21] Appl. No. 819,810
[22] Filed Apr. 28, 1969
[45] Patented Feb. 2, 1971
[73] Assignee Fischer & Porter Co. Warminster, Pa. a corporation of Pennsylvania

[54] FUNCTION GENERATOR HAVING A MULTI-CHANNEL AMPLIFYING SYSTEM WITH EACH CHANNEL HAVING AN ADJUSTABLE SCOPE AND BREAK POINT
6 Claims, 7 Drawing Figs.

[52] U.S. Cl. .......... 235/197, 307/229, 328/143
[51] Int. Cl. .......... G06g 7/28
[50] Field of Search .......... 235/197, 150, 53, 194, 193, 185, 195, 184; 328/142, 143; 307/229, 230

[56] References Cited

UNITED STATES PATENTS

| | | | |
|---|---|---|---|
| 2,896,082 | 7/1959 | Raymond et al. | 235/197 |
| 3,191,017 | 6/1965 | Miura et al. | 235/197X |
| 3,226,641 | 12/1965 | Miller | 235/197 |
| 3,443,082 | 5/1969 | Abe | 235/197 |
| 3,185,827 | 5/1965 | Hernoon | 235/197 |

*Primary Examiner*—Malcolm A. Morrison
*Assistant Examiner*—Joseph F. Ruggiero
*Attorney*—Michael Ebert

ABSTRACT: A function generator for producing an output signal which varies as a prescribed mathematical function of an input signal. The generator comprises a bank of like amplifying channels whose inputs are connected in shunt relation, the input signal being applied concurrently to all channels. Each channel includes adjustable gain control means to vary the amplification slope thereof, and means to adjust the breakpoint thereof to vary the input level at which the channel is conductive. The output of each channel is fed through a separate polarity-reversing switch to a common summing amplifier whose output signal is functionally related to the input signal in accordance with the combined slopes of the amplifying channels as determined by their respective polarities.

INVENTOR.
John E. Schussler
BY Michael Ebert
Attorney

INVENTOR.
JOHN E. SCHUSSLER
BY [signature]
ATTORNEY

FUNCTION GENERATOR HAVING A MULTI-CHANNEL AMPLIFYING SYSTEM WITH EACH CHANNEL HAVING AN ADJUSTABLE SCOPE AND BREAK POINT

BACKGROUND OF THE INVENTION

This invention relates generally to function generators or characterizers, and more particularly to a function generator constituted by a multichannel amplifying system responsive to the input signal, each channel having an adjustable slope and break point and providing a segment of the plot of the desired output signal.

Function generators or characterizers are devices whose output signal must vary as a prescribed mathematical function of the input signal. Such devices can be used to simulate a nonlinear element on an analogue computer. Function generators are also usable for correcting a nonlinear element so that the output of the generator becomes a linear function of the input applied to the nonlinear element.

Existing function generators in some instances employ nonlinear elements such as thyristors, but the more common type contains networks of diodes and resistors, such that a given arbitrary function can be approximated by a number of straight line segments. Bias and resistor values determine the junction points and slopes of each segment of a plot of the output voltage as a function of the input voltage.

In one known form of function generator, the input of feedback resistors in an operational amplifier is adjusted to create the desired functional relationship. This is accomplished by selectively placing additional resistors in parallel to the input resistor or the feedback resistor at fixed levels or breakpoints of inputs. The amount of parallel resistance is variable and thereby controls the slope of the segment. For more complex curves, both resistors have parallel additions, that is, input and output. This technique is less accurate because of fixed breakpoints, and more complicated for complex curves.

Existing function generators of the above-described type are difficult to program to fit a desired characteristic particularly when a complex curve is involved and the relationship changes from concave to convex. Moreover, with an operational amplifier acting in conjunction with variable feedback resistors, the loop gain is not constant, thereby creating gain or sensitivity problems.

BRIEF DESCRIPTION OF INVENTION

In view of the foregoing, it is the main object of this invention to provide a function generator which may readily be programmed to fit a desired characteristic, even when a complex curve is involved.

More specifically, it is an object of this invention to provide a function generator constituted by a bank of like amplifying channels whose outputs are summed, each channel producing a segment of a plot of the desired output signal as a function of the input signal applied concurrently to all channels.

A significant advantage of the invention is that the gain of each amplifier in the system is constant for any given setting, thereby obviating sensitivity problems. The input amplifiers are adjustable, but for any particular slope setting, the gain is fixed. Another feature of the system is that by the use of a sufficient number of channels one may obtain a very close approximation of a prescribed function curve.

Briefly stated, these objects are attained in a function generator comprising a bank of like amplifying channels whose inputs are in shunt relation, the input signal being applied concurrently to all channels. Each channel includes a gain control to vary the amplification slope thereof, and bias means to adjust the breakpoint which sets the input signal level at which the channel is conductive. The output of each channel is fed through a separate polarity-reversing switch to a common summing amplifier whose output signal is functionally related to the input signal in accordance with the combined slopes of the channels as determined by their respective polarities. The output of the summing amplifier may be converted into corresponding current values.

BRIEF DESCRIPTION OF DRAWING

For a better understanding of the invention, as well as other objects and further features thereof, reference is made to the following detailed description to be read in conjunction with the accompanying drawing, wherein.

DESCRIPTION OF INVENTION

Figure 1:
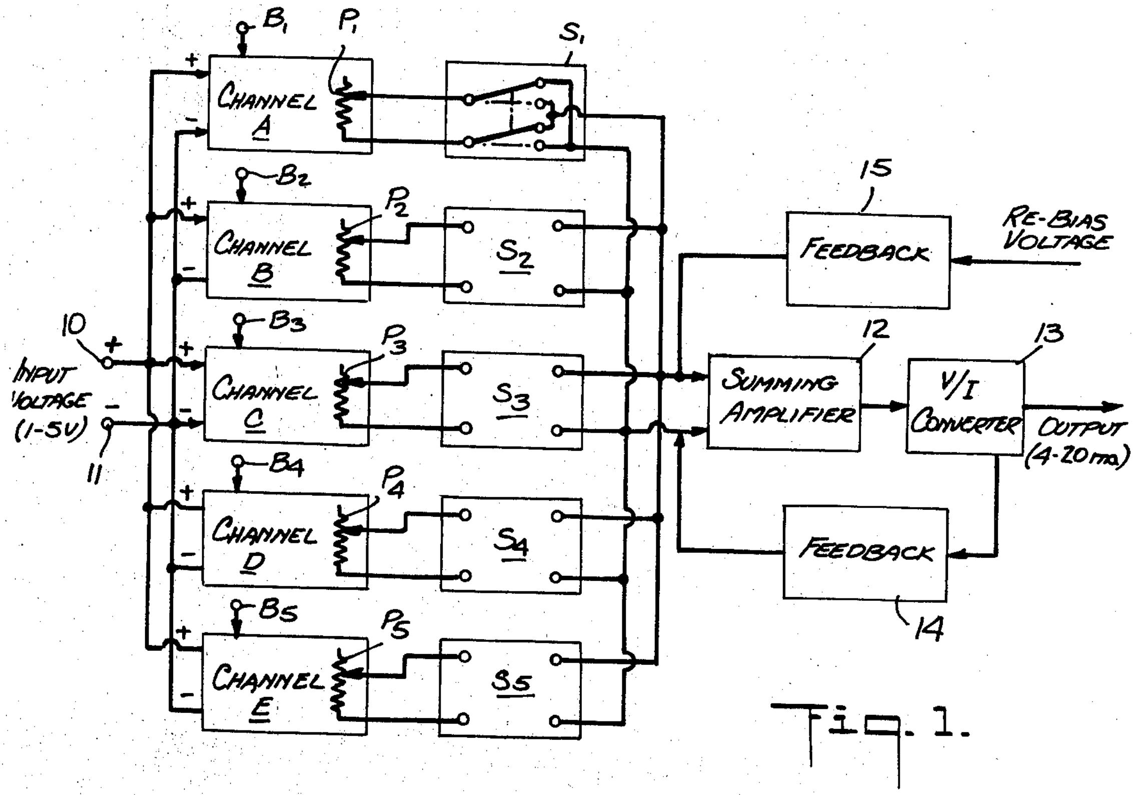
FIG. 1 is a block diagram of a function generator system in accordance with the invention.

Referring now to the drawing, and more particularly to FIG. 1, there is shown a function generator in accordance with the invention adapted to approximate an input-output function. By way of illustration, the system is disclosed as having five channels to provide five adjustable slopes, but in practice, a smaller or greater number of channels may be used, depending on how closely one wishes to approximate particular functions.

In the system disclosed herein, the generator is designed to operate with an input signal in the range of 1 to 5 volts, and to produce an output current in the range of 4 to 20 ma., to meet certain process control requirements. In practice, however, the system may be made to operate with any desired input and output range of voltage and current values.

The function generator comprises five identical amplifying channels A, B, C, D and E, whose inputs are connected in shunt relation to input terminals 10 and 11. Applied to these terminals is an input signal in the 1 to 5-volt range, the same input being applied concurrently in the same polarity to all channels.

Each amplifier channel includes a potentiometer or equivalent means $P_1$, $P_2$, $P_3$, $P_4$, $P_5$) for adjusting the gain of the channel and hence the slope of the output. Provision is also made in each channel for adjusting the breakpoint, this being accomplished by a variable bias source ($B_1$, $B_2$, $B_3$, $B_4$, $B_5$), at the channel input. The breakpoint is determined by the level of input voltage necessary to overcome the applied bias, the channel being conductive only above the breakpoint.

The outputs of all the amplifying channels are fed through respective switches $S_1$, $S_2$, $S_3$, $S_4$ and $S_5$, to a summing amplifier 12. The switches are adapted to reverse the polarity of the channel outputs applied to the summing amplifier to effect a sum or difference effect.

In order to convert the voltage output of summing amplifier 12 to corresponding current values in the 4 to 20 ma. range, the output of the amplifier is fed to a voltage-to-current converter 13 of standard design, a negative feedback network 14 being connected between the converter and amplifier to maintain a linear relationship therebetween. In order to assure a minimum (4 ma.) output at 0 percent input to summing amplifier 12, and adjustable rebias voltage is applied to the input through feedback network 15 so that even in the absence of an input voltage to the summing amplifier, the system will yield a 4 ma. current output.

The breakpoint in each channel (A to E) is adjustable within the 0 percent to 100 percent range of input values (one to five volts), the slope of each channel being adjustable throughout this range. The polarity-reversing switch associated with each channel determines whether a negative or minus slope is to be produced.

In practice, the first channel A is adjusted by the breakpoint adjust $B_1$ to conduct at 0 percent input. The associated switch $S_1$ selects an increasing or decreasing initial slope. The adjustable slope potentiometer $P_1$ selects the magnitude of this slope. The second channel B can be made to conduct on any percentage of input, using the breakpoint adjust $B_2$ for this purpose. The contribution of the second channel can be elected to increase or decrease by the operation of switch $S_2$. The magnitude of the resultant slope becomes the combination of the two working channels. At any input level, the resultant slope is the sum and difference (depending on switch selection) of the slopes of those channels having breakpoints below that level of input.

Figure 2:
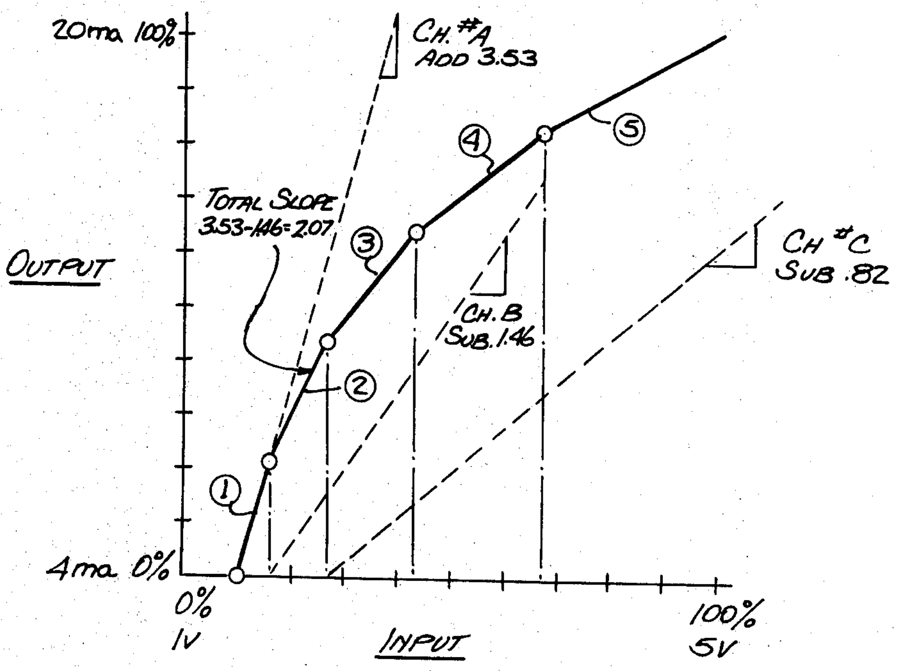
FIG. 2 is a curve illustrating the manner in which the function curve is produced by the combined slopes of the several channels forming the system.

The accuracy of the approximation depends on how closely the five straight slopes produced by the five channels fit the nonlinear relation. For small error, where the slope is changing more rapidly, the breakpoints should be closer together. As an example, one decade of a log curve, as shown in FIG. 2, was approximated with five slopes 1, 2, 3, 4 and 5, each slope constituting a segment of a plot of the output signal as a function of input signal.

Since it is only one decade, inputs below 10 percent are ignored in the example illustrated. It was found that with breakpoints and slopes as listed below the five slopes had a maximum error of less than 1 percent.

| | Break point, v. | Slope | Plus or minus | Overall slope |
|---|---|---|---|---|
| Channel: | | | | |
| A | 1.4 | 3.53 | + | +3.53 |
| B | 1.64 | 1.46 | − | +2.07 (3.53−1.46=2.07) |
| C | 2.08 | .82 | − | +1.25 (2.07−.82=1.25) |
| D | 2.72 | .45 | − | +.8 (1.25−.45=.8) |
| E | 3.68 | .28 | − | +.52 (.8−.28=.52) |

Note that in the first half of the curve where the slope changes most quickly the number of straight approximating slopes has to be greatest. The straight line approximation would be reproduced by the instrument to within ± 0.5 percent accuracy. However, in this case, the approximation conforms to the desired log curve with a ± 1 percent accuracy.

Figure 3:
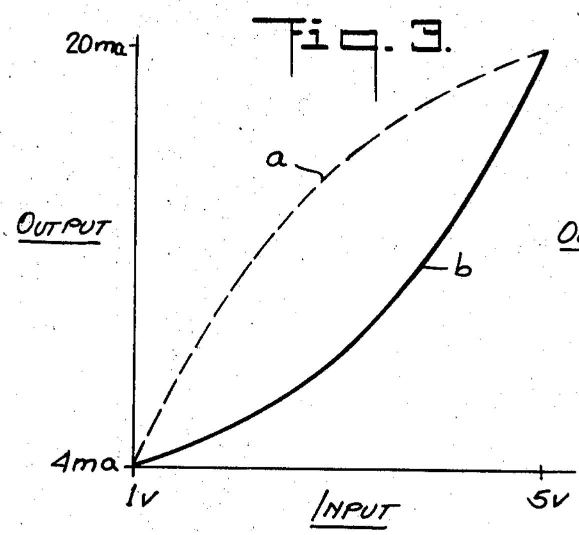
FIGS. 3 to 7 show typical input-output relations made possible by the function generator system.
Figure 4:
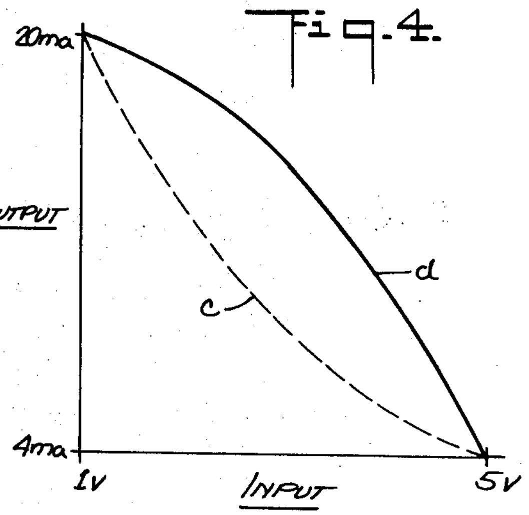
Figure 5:
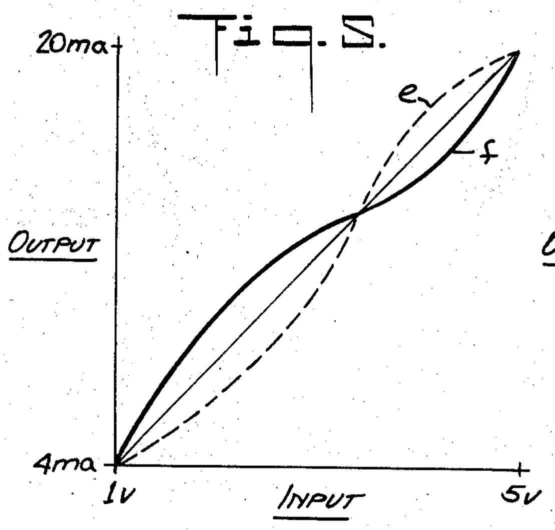
Figure 6:
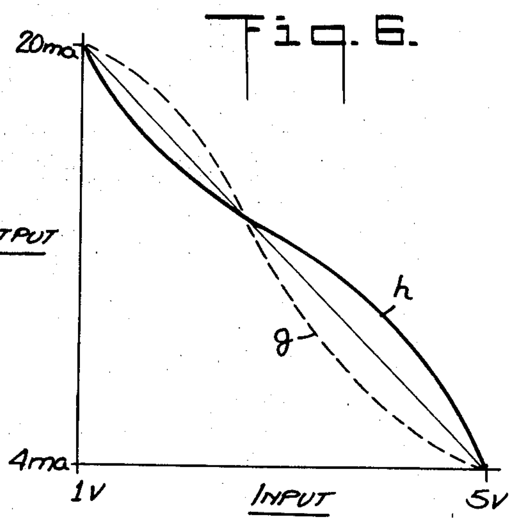
Figure 7:
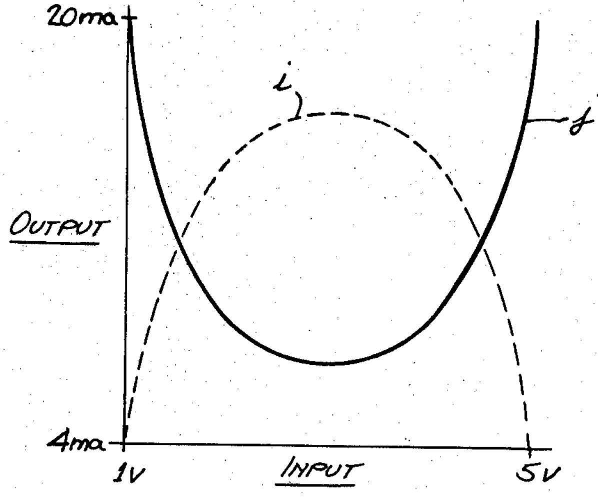

In FIGS. 3 to 7, by way of example, there are shown ten possible input-output relations, the curves in each instance being plotted with a 1—5 volt input range, and a 4 ma. to 20 ma. current range in the output. FIG. 3 shows two possible curves *a* and *b*, curve *b* being the reverse complement of curve *a*. FIG. 4 shows complementary curves *c* and *d*, FIG. 5, complementary curves *e* and *f*, FIG. 6, complementary curves *g* and *h*, and FIG. 7, complementary curves *i* and *j*. The system may be readily adjusted to develop the plot of any complex curve.

While there has been shown and described a preferred embodiment of a function generator in accordance with the invention, it will be appreciated that many changes and modifications may be made therein without, however, departing from the essential spirit of the invention.

I claim:

1. A function generator comprising:

a. a plurality of like amplifying channels, each having gain control means to vary the amplification slope thereof and means including a variable bias source to adjust the breakpoint thereof, whereby the amplifying channel conducts only when the bias voltage is exceeded by an input signal;

b. means to apply an input signal to all of said channels concurrently;

c. a differential summing amplifier having positive and negative input terminals; and d. means coupling each channel to the input terminals of said amplifier through a polarity-reversing switch whereby the output of the amplifier is a signal which is functionally related to the input signal in accordance with the combined slopes of the channels as determined by their respective polarities.

2. A generator as set forth in claim 1, further including a voltage-to-current converter coupled to the output of said amplifier to produce an output current corresponding to the output voltage of the amplifier.

3. A generator as set forth in claim 2, further including a feedback network between said converter and the input of said amplifier to maintain a linear relationship between said output current and said output voltage.

4. A generator as set forth in claim 1, further including adjustable rebias means coupled to the input of said amplifier to provide a minimum output in the absence of an input to the amplifier from the channels.

5. A generator as set forth in claim 1, wherein said input signal is a voltage in the range of 1 to 5 volts.

6. A generator as set forth in claim 2, wherein said current is in the range of 4 to 20 ma.